US012528395B2

(12) United States Patent
Masuda et al.

(10) Patent No.: US 12,528,395 B2
(45) Date of Patent: Jan. 20, 2026

(54) AIR SUPPLY APPARATUS

(71) Applicant: AISIN CORPORATION, Kariya (JP)

(72) Inventors: Satoshi Masuda, Kariya (JP); Tomokazu Seki, Kariya (JP); Tomohiro Hori, Kariya (JP); Reiji Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 176 days.

(21) Appl. No.: 18/483,562

(22) Filed: Oct. 10, 2023

(65) Prior Publication Data

US 2024/0140286 A1 May 2, 2024

(30) Foreign Application Priority Data

Oct. 28, 2022 (JP) ................... 2022-173396

(51) Int. Cl.
*B60N 2/66* (2006.01)
*B60N 2/22* (2006.01)

(52) U.S. Cl.
CPC ............... *B60N 2/665* (2015.04); *B60N 2/22* (2013.01)

(58) Field of Classification Search
CPC ....... B60N 2/665; B60N 2/914; F16M 11/041
See application file for complete search history.

(56) References Cited

U.S. PATENT DOCUMENTS

| | | | | |
|---|---|---|---|---|
| 3,302,912 A | * | 2/1967 | Hurlburt, Jr. ........... | F16K 27/00 248/65 |
| 3,388,885 A | * | 6/1968 | Holmes .................... | H02B 1/04 248/500 |
| 4,917,143 A | * | 4/1990 | Grooms ................ | F16L 37/144 251/367 |
| 5,044,526 A | * | 9/1991 | Sasaki .................. | F02M 37/103 222/377 |
| 5,356,105 A | * | 10/1994 | Andrews ................ | B63B 35/14 248/221.11 |
| 5,381,243 A | * | 1/1995 | Imamura ................ | H04N 1/028 248/221.11 |
| 5,495,392 A | * | 2/1996 | Shen ..................... | H01L 23/467 165/185 |

(Continued)

FOREIGN PATENT DOCUMENTS

| | | |
|---|---|---|
| JP | 2012-183844 A | 9/2012 |
| JP | 2014-213739 A | 11/2014 |

*Primary Examiner* — Joshua J Michener (74) *Attorney, Agent, or Firm* — Oblon, McClelland, Maier & Neustadt, L.L.P.

(57) ABSTRACT

An air supply apparatus supplies air to an airbag of a seat includes a support panel and a functional component. A first direction is a thickness of the base, a second direction is orthogonal to the first direction, and a direction orthogonal to both the first direction and the second direction is a third direction. A first restriction wall and a second restriction wall extend from the base in the first direction, spaced at an interval in the second direction, and sandwich the functional component in the second direction. A coupling wall extends from the base in the first direction and couples the first restriction wall to the second restriction wall in the second direction. Two guide walls are spaced in the third direction and sandwich the functional component in the third direction. Pressing portions sandwich the functional component together with the coupling wall in the first direction.

7 Claims, 7 Drawing Sheets

(56) References Cited

U.S. PATENT DOCUMENTS

| | | | | |
|---|---|---|---|---|
| 6,392,885 B1* | 5/2002 | Lee | ............... | H01L 23/3672 |
| | | | | 174/16.3 |
| 6,612,536 B2* | 9/2003 | Dalton | ............... | F16K 31/385 |
| | | | | 251/30.05 |
| 6,707,674 B1* | 3/2004 | Bryant | ............... | H01L 23/4093 |
| | | | | 361/801 |
| 6,959,910 B2* | 11/2005 | Matsumoto | ............... | F16K 31/0627 |
| | | | | 251/129.03 |
| 7,350,537 B2* | 4/2008 | Honermann | ............... | A01C 23/008 |
| | | | | 248/316.7 |
| 7,619,892 B2* | 11/2009 | Liang | ............... | H01L 23/4093 |
| | | | | 248/510 |
| 7,926,779 B2* | 4/2011 | Caldwell | ............... | F16M 7/00 |
| | | | | 248/612 |
| 8,172,190 B2* | 5/2012 | Dang | ............... | F04D 29/605 |
| | | | | 248/220.22 |
| 9,228,669 B2* | 1/2016 | Iwata | ............... | F16K 27/0236 |
| 10,080,502 B2* | 9/2018 | Sano | ............... | A61B 5/0235 |
| 12,313,177 B2* | 5/2025 | Kubota | ............... | F16K 41/12 |
| 2005/0287024 A1* | 12/2005 | Der Marderosian | ............... | B60N 2/914 |
| | | | | 417/423.15 |
| 2016/0129920 A1* | 5/2016 | Hall | ............... | B60W 40/08 |
| | | | | 701/1 |
| 2020/0100599 A1* | 4/2020 | Chang | ............... | A47C 7/467 |
| 2020/0153131 A1* | 5/2020 | Soubjaki | ............... | H02K 7/116 |
| 2020/0171989 A1* | 6/2020 | Inoue | ............... | F16K 27/003 |
| 2021/0276469 A1* | 9/2021 | Sakai | ............... | F04B 35/04 |
| 2022/0144216 A1* | 5/2022 | Park | ............... | F16K 27/003 |
| 2022/0379789 A1* | 12/2022 | Sakai | ............... | B60N 2/914 |

* cited by examiner

AIR SUPPLY APPARATUS

CROSS REFERENCE TO RELATED APPLICATIONS

This application is based on and claims priority under 35 U.S.C. § 119 to Japanese Patent Application 2022-173396, filed on Oct. 28, 2022, the entire content of which is incorporated herein by reference.

TECHNICAL FIELD

This disclosure relates to an air supply apparatus.

BACKGROUND DISCUSSION

JP 2014-213739A (Reference 1) discloses an air supply apparatus housed in a seat back of a vehicle seat. The air supply apparatus includes an airbag that inflates or contracts, and a support panel that supports the airbag. The air supply apparatus adjusts a support mode for a waist of a user seated on the vehicle seat by causing the airbag to inflate or contract. In this way, the air supply apparatus enables the user to take an ideal sitting posture.

In the air supply apparatus described above, the airbag and a functional component for causing the airbag to inflate or contract are mounted on the support panel. It is desired that work of mounting the functional component on such a support panel should be simplified as much as possible.

SUMMARY

According to an aspect of this disclosure, an air supply apparatus for supplying air to an airbag for pressing a user seated on a seat includes: a functional component that is configured to supply air to the airbag; and a support panel on which the functional component is mounted and that is made of a resin material, in which the support panel includes a base having a plate shape, when a direction along a plate thickness direction of the base is a first direction, a direction orthogonal to the first direction is a second direction, and a direction orthogonal to both the first direction and the second direction is a third direction, a first restriction wall and a second restriction wall that extend from the base in the first direction in a state of being spaced at an interval in the second direction and that sandwich the functional component in the second direction, a coupling wall that extends from the base in the first direction and that couples the first restriction wall to the second restriction wall in the second direction, two guide walls that are spaced at an interval in the third direction and that sandwich the functional component in the third direction, and pressing portions that sandwich the functional component together with the coupling wall in the first direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a vehicle seat including an air supply apparatus will be described.

Configuration According to Present Embodiment

Figure 1:
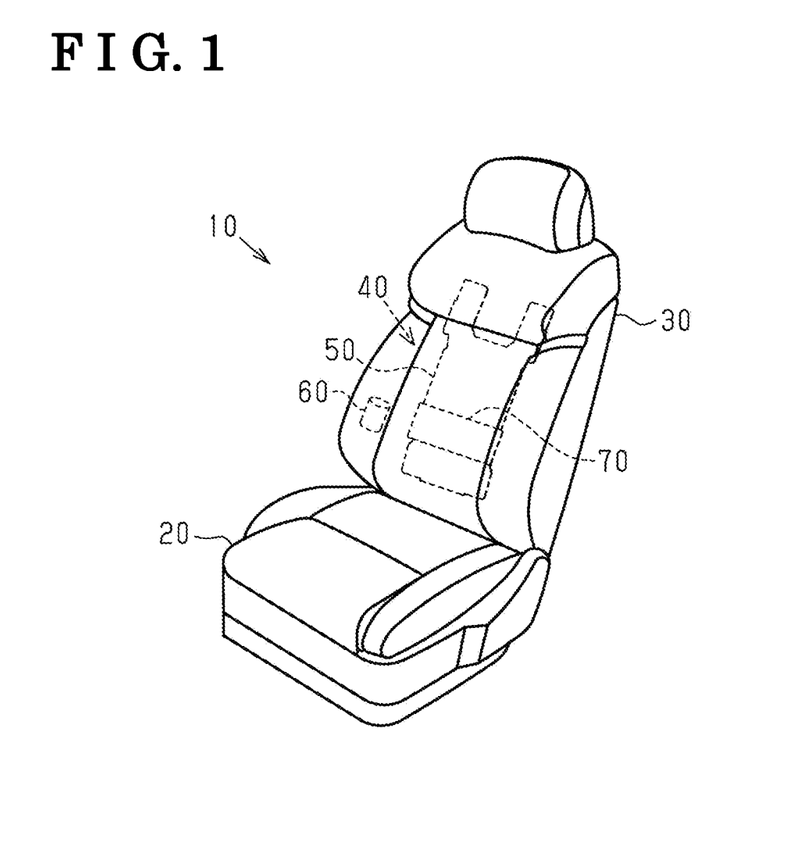
FIG. 1 is a schematic view of a vehicle seat including an air supply apparatus.

As shown in FIG. 1, a vehicle seat 10 includes a seat cushion 20, a seat back 30, and an air supply apparatus 40. The vehicle seat 10 corresponds to, for example, a driver seat, a front passenger seat, and a rear seat in a vehicle.

Seat Cushion 20 and Seat Back 30

The seat cushion 20 is a portion that supports buttocks and thighs of a user. Although illustration is omitted, the seat cushion 20 includes a seat frame constituting a skeleton, a cushion spring supported by the seat frame, a cushion pad attached to the cushion spring, and a cover covering the cushion pad.

Figure 2:
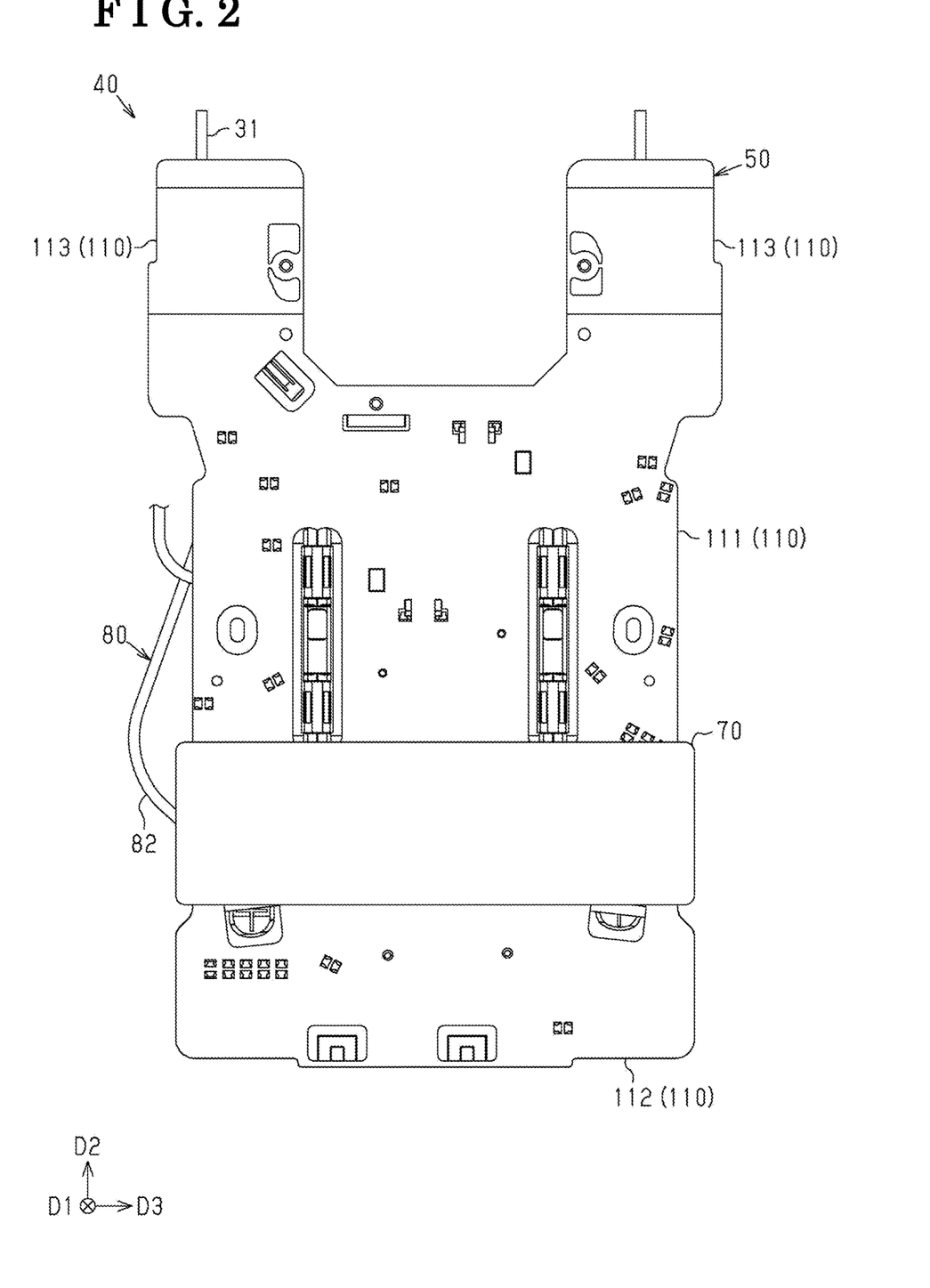
FIG. 2 is a front view of the air supply apparatus.
Figure 3:
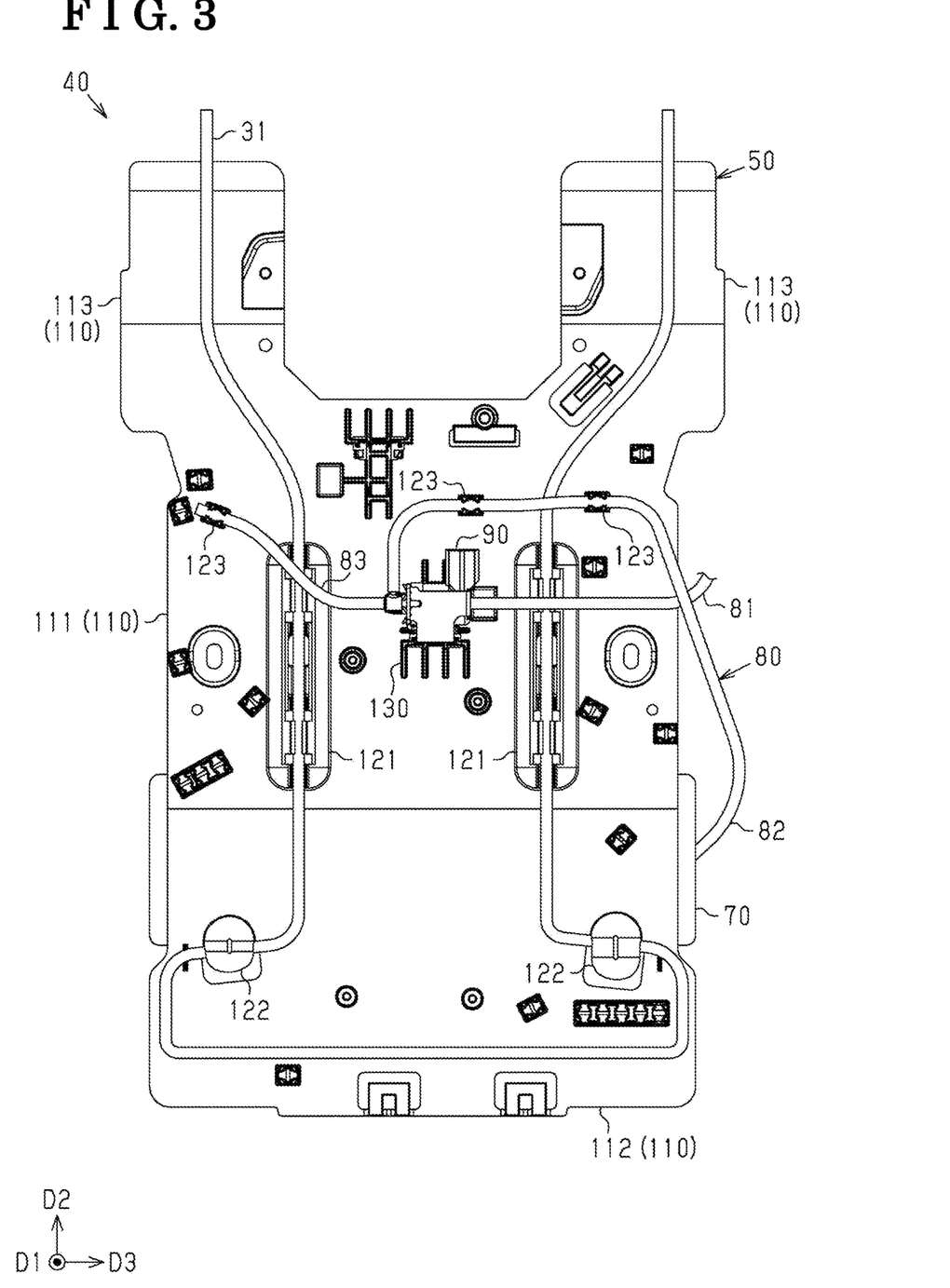
FIG. 3 is a rear view of the air supply apparatus.

The seat back 30 is a portion that supports a back of the user. Although illustration is omitted, the seat back 30 includes a seat frame constituting a skeleton, a cushion spring supported by the seat frame, a cushion pad attached to the cushion spring, and a cover covering the cushion pad. FIGS. 2 and 3 show a wire frame 31 that constitutes a part of the seat frame of the seat back 30.

Air Supply Apparatus 40

As shown in FIGS. 1 to 3, the air supply apparatus 40 includes a support panel 50, a pump 60, an airbag 70, a connection tube 80, and a valve unit 90.

Support Panel 50

As shown in FIGS. 2 and 3, the support panel 50 includes a base plate 110, a plurality of frame holding portions 121 and 122, a plurality of tube holding portions 123, and a plurality of valve holding portions 130. In the support panel 50, the base plate 110, the plurality of frame holding portions 121 and 122, the plurality of tube holding portions 123, and the plurality of valve holding portions 130 are integrally molded with one another from a resin material. For example, the support panel 50 can be molded by two dies separate in a certain direction.

The base plate 110 has a plate shape. The base plate 110 includes a first plate 111, a second plate 112, and two third plates 113. In the drawing, a first direction D1 is a plate thickness direction of the first plate 111, a second direction D2 is a direction orthogonal to the first direction D1, and a third direction D3 is a direction orthogonal to both the first direction D1 and the second direction D2. In a state where the air supply apparatus 40 is housed in the seat back 30, the first direction D1 is a thickness direction of the seat back 30, the second direction D2 is a height direction of the seat back 30, and the third direction D3 is a width direction of the seat back 30. The first direction D1 may be a direction slightly inclined with respect to the plate thickness direction of the first plate 111. That is, a direction along the plate thickness direction of the base plate 110 may include not only the plate thickness direction of the first plate 111, but also the direction slightly inclined with respect to the plate thickness direction of the first plate 111.

The first plate 111, the second plate 112, and the two third plates 113 each have a rectangular plate shape. The first plate 111 and the second plate 112 are portions corresponding to the back and a waist of the user seated on the vehicle seat 10, and the two third plates 113 are portions corresponding to two shoulders of the user seated on the vehicle seat 10. The first plate 111 is located between the second plate 112 and the two third plates 113 in the second direction D2. Further, the two third plates 113 are spaced at an interval in the third direction D3. The first plate 111 corresponds to a "base".

As shown in FIG. 3, the plurality of frame holding portions 121 and 122 include two first frame holding portions 121 provided on a back surface of the first plate 111, and two second frame holding portions 122 provided on a back surface of the second plate 112. The two first frame holding portions 121 hold portions of the wire frame 31 that extend in the second direction D2. The two second frame holding portions 122 hold portions of the wire frame 31 that extend in the third direction D3. The plurality of tube holding portions 123 are provided on the back surface of the first plate 111. The tube holding portions 123 hold the connection tube 80.

Figure 4:
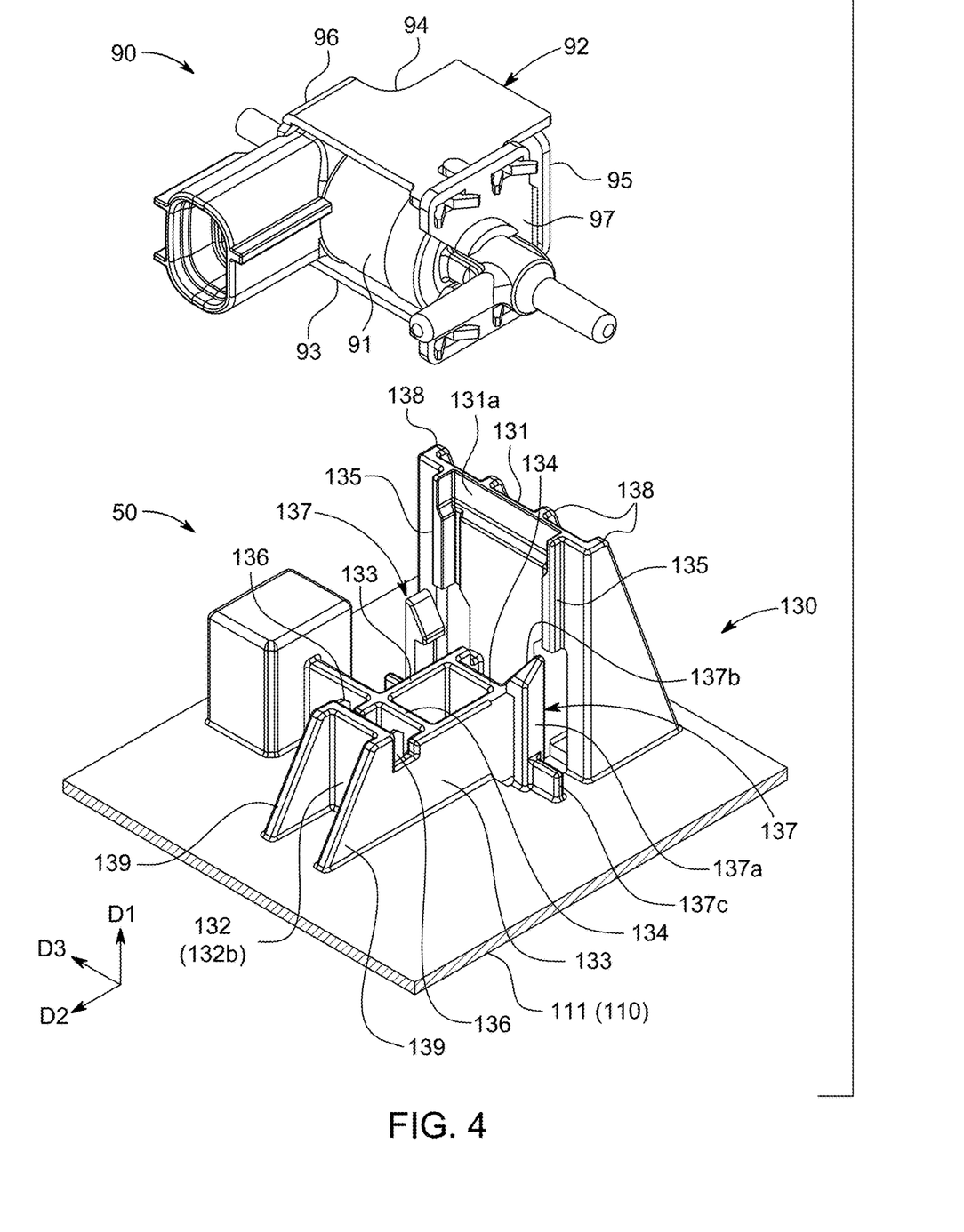
FIG. 4 is a perspective view of a valve holding portion and a valve unit.
Figure 5:
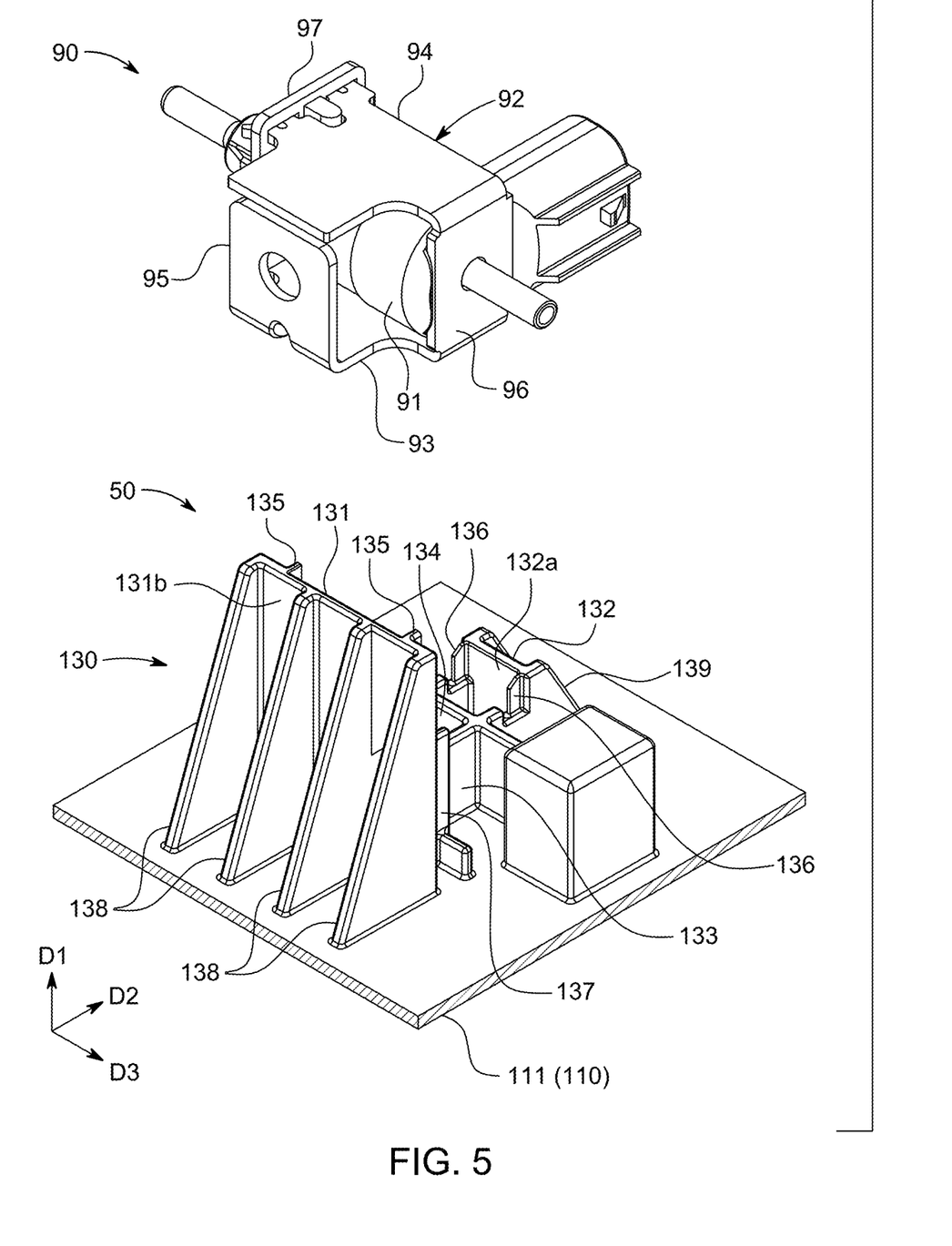
FIG. 5 is a perspective view of the valve holding portion and the valve unit.

As shown in FIGS. 4 and 5, the valve holding portion 130 includes a first restriction wall 131, a second restriction wall 132, two coupling walls 133, two intermediate walls 134, two guide walls 135, two variable ribs 136, two engagement walls 137, four first reinforcement ribs 138, and two second reinforcement ribs 139. In the following description, a length in the first direction D1 with reference to the first plate 111 is also simply referred to as a "height".

As shown in FIGS. 4 and 5, the first restriction wall 131 and the second restriction wall 132 each extend in the first direction D1 from the first plate 111 in a state of being spaced at an interval in the second direction D2. The first restriction wall 131 and the second restriction wall 132 each have a rectangular plate shape whose thickness direction is the second direction D2. The first restriction wall 131 is larger than the second restriction wall 132. Specifically, lengths of the first restriction wall 131 in both the first direction D1 and the third direction D3 are larger than those of the second restriction wall 132. In the following description, in two surfaces of the first restriction wall 131 intersecting the second direction D2, the surface facing the second restriction wall 132 is referred to as a first inner surface 131a, and the surface on a side opposite to the first inner surface 131a is referred to as a first outer surface 131b. Similarly, in two surfaces of the second restriction wall 132 intersecting the second direction D2, the surface facing the first restriction wall 131 is referred to as a second inner surface 132a, and the surface on a side opposite to the second inner surface 132a is referred to as a second outer surface 132b.

The two coupling walls 133 each extend in the first direction D1 from the first plate 111 in a state of being spaced at an interval in the third direction D3. The two coupling walls 133 each have a rectangular plate shape whose thickness direction is the third direction D3. A height of the coupling wall 133 is smaller than a height of the first restriction wall 131 and a height of the second restriction wall 132. Further, a height of both end portions of the coupling wall 133 in the second direction D2 is smaller than a height of an intermediate portion of the coupling wall 133 in the second direction D2. The two coupling walls 133 connect the first restriction wall 131 and the second restriction wall 132 in the second direction D2. The interval between the two coupling walls 133 is equal to a length of the second restriction wall 132 in the third direction D3.

The two intermediate walls 134 each extend in the first direction D1 from the first plate 111 in a state of being spaced at an interval in the second direction D2. The two intermediate walls 134 each have a rectangular plate shape whose thickness direction is the second direction D2. A height of the intermediate wall 134 is a height the same as that of a central portion of the coupling wall 133 in the second direction D2. The two intermediate walls 134 connect the two coupling walls 133 between the first restriction wall 131 and the second restriction wall 132.

The two guide walls 135 each extend in the second direction D2 from the first inner surface 131a of the first restriction wall 131 in a state of being spaced at an interval in the third direction D3. A cross-sectional shape of the two guide walls 135 orthogonal to the first direction D1 is rectangular. In the first direction D1, a length of each of the two guide walls 135 is smaller than the height of the first restriction wall 131. That is, the two guide walls 135 extend from portions of the first restriction wall 131 on a distal end side, and do not extend from portions of the first restriction wall 131 on a proximal end side. Further, in the two guide walls 135, an interval of a portion near a distal end of the first restriction wall 131 in the third direction D3 is larger than an interval of the other portion in the third direction D3.

The variable rib 136 extends from the second inner surface 132a of the second restriction wall 132 toward the first restriction wall 131. When viewed from the third direction D3, the variable rib 136 has a rectangular shape. A length of the variable rib 136 in the first direction D1 is smaller than a length of the variable rib 136 in the second direction D2. In the third direction D3, a thickness of the variable rib 136 is smaller than a thickness of the second restriction wall 132. Further, the variable rib 136 extends from a position near a distal end of the second restriction wall 132. It can also be said that the variable rib 136 extends from the coupling wall 133 in the first direction D1.

Figure 6:
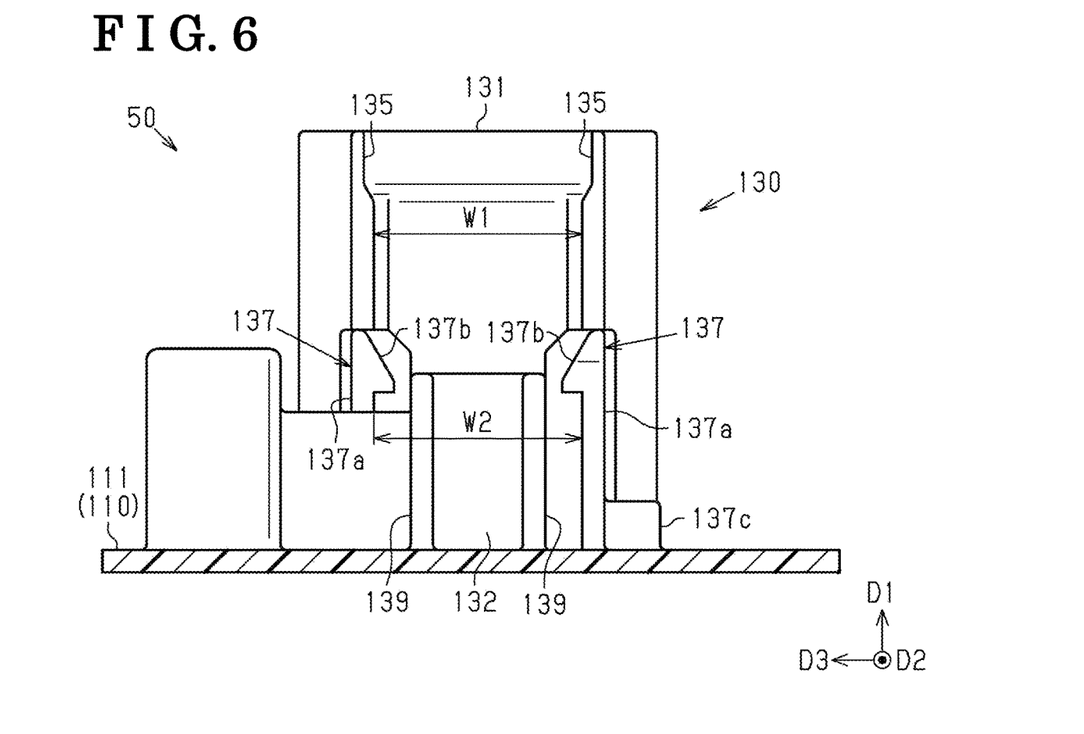
FIG. 6 is a side view of the valve holding portion.

The two engagement walls 137 are located between the first restriction wall 131 and the second restriction wall 132 in the second direction D2 in a state of being spaced at an interval in the third direction D3. The engagement wall 137 includes an extension portion 137a that extends from the first plate 111 in the first direction D1, a locking portion 137b that extends from a distal end of the extension portion 137a, and a reinforcement portion 137c that connects the first plate 111 to the extension portion 137a. The extension portion 137a has a quadrangular columnar shape whose height direction is the first direction D1. As shown in FIG. 6, in the third direction D3, an interval W2 between the extension portions 137a of the two engagement walls 137 is larger than an interval W1 between the two guide walls 135. The two locking portions 137b each extend in a direction in which the two locking portions 137b approach each other in the third direction D3. The locking portion 137b has a claw shape. Specifically, the locking portion 137b includes a locking surface orthogonal to the first direction D1, and a reception surface inclined with respect to both the first direction D1 and the third direction D3. An interval between the two locking portions 137b in the third direction D3 becomes larger as a distance from the first plate 111 increases. The engagement wall 137 corresponds to a "pressing portion".

As shown in FIGS. 4 and 5, the four first reinforcement ribs 138 each extend from the first plate 111 in the first direction D1 in a state of being arranged at equal intervals in the third direction D3. The four first reinforcement ribs 138 are connected to the first outer surface 131b of the first restriction wall 131. The four first reinforcement ribs 138 each have a plate shape whose thickness direction is the third direction D3. The four first reinforcement ribs 138 each have a triangular shape in a side view in the third direction D3.

Therefore, a length of each of the four first reinforcement ribs 138 in the second direction D2 becomes smaller in a height direction. In the third direction D3, positions of two in the four first reinforcement ribs 138 are aligned with positions of the two coupling walls 133.

The two second reinforcement ribs 139 each extend from the first plate 111 in the first direction D1 in a state of being arranged at an interval in the third direction D3. The two second reinforcement ribs 139 are connected to the second outer surface 132b of the second restriction wall 132. The two second reinforcement ribs 139 each have a plate shape whose thickness direction is the third direction D3. The two second reinforcement ribs 139 each have a triangular shape in a side view in the third direction D3. Therefore, a length of each of the two second reinforcement ribs 139 in the second direction D2 becomes smaller in a height direction. In the third direction D3, the two second reinforcement ribs 139 are aligned with the positions of the two coupling walls 133.

Pump 60

The pump 60 may be an electric pump using an electric motor as a drive source. The pump 60 sends out air by driving the electric motor based on power supplied from a battery. As shown in FIG. 1, in the present embodiment, the pump 60 is housed in the seat back 30 separately from the support panel 50.

Airbag 70

As shown in FIG. 2, the airbag 70 is a support airbag 70 that supports the waist of the user. In other words, the airbag 70 is a lumbar support airbag. Therefore, it is preferable that a size of the airbag 70 is a size corresponding to the waist of the user. The airbag 70 is disposed across the first plate 111 and the second plate 112. As an example, the airbag 70 may be configured by joining outer edges of two resin films.

Connection Tube 80

As shown in FIG. 3, the connection tube 80 includes a first air supply tube 81, a second air supply tube 82, and an exhaust tube 83. The first air supply tube 81 connects the pump 60 to a switching valve 91 to be described later. The second air supply tube 82 connects the switching valve 91 to the airbag 70. The exhaust tube 83 connects the switching valve 91 to the atmosphere. Further, although illustration is omitted, it is preferable that the first air supply tube 81 is provided with a check valve that allows a flow of air from the pump 60 to the switching valve 91 and that restricts the flow of the air from the switching valve 91 to the pump 60.

Valve Unit 90

As shown in FIGS. 4 and 5, the valve unit 90 includes the switching valve 91 and a housing 92. The switching valve 91 is a solenoid valve. When not energized, the switching valve 91 connects the first air supply tube 81 to the second air supply tube 82, and does not connect the first air supply tube 81 to the exhaust tube 83. On the other hand, when energized, the switching valve 91 connects the first air supply tube 81 to the exhaust tube 83, and does not connect the first air supply tube 81 to the second air supply tube 82.

The housing 92 is molded by bending one or two or more metal plates. The housing 92 includes first side walls 93 and 94 intersecting the first direction D1, a second side wall 95 intersecting the second direction D2, and third side walls 96 and 97 intersecting the third direction D3. The first side walls 93 and 94, the second side wall 95, and the third side walls 96 and 97 each have a plate shape. The first side walls 93 and 94 are spaced at an interval in the first direction D1. The second side wall 95 extends from one end portion of the first side wall 93 in the second direction D2 toward one end portion of the first side wall 94 in the second direction D2.

The third side wall 96 connects one end portions of the first side walls 93 and 94 in the third direction D3, and the third side wall 97 connects the other end portions of the first side walls 93 and 94 in the third direction D3. Here, the third side wall 96 is molded integrally with the first side walls 93 and 94, and the third side wall 97 is molded separately from the first side walls 93 and 94. The first side walls 93 and 94 sandwich the switching valve 91 in the first direction D1. The second side wall 95 covers the switching valve 91 from one side in the second direction D2. The third side walls 96 and 97 sandwich the switching valve 91 in the third direction D3. In this way, the housing 92 is integrated with the switching valve 91 by covering the switching valve 91 from a plurality of directions.

Operations of Present Embodiment

Operations in a case of mounting the valve unit 90 on the support panel 50 will be described with reference to FIGS. 7 to 9. In a cross-sectional view shown in FIG. 9, a cross-sectional view of the switching valve 91 is omitted.

Figure 7:
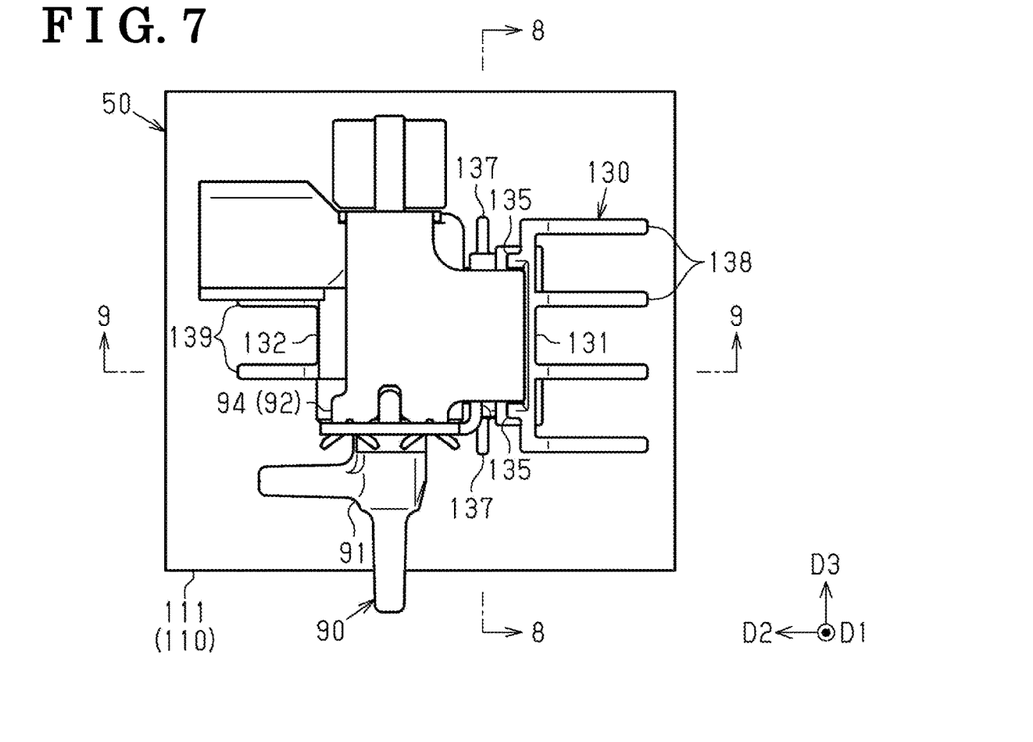
FIG. 7 is a plan view of the valve holding portion.

As shown in FIG. 7, in the case of mounting the valve unit 90 on the support panel 50, the valve unit 90 is aligned with the valve holding portion 130 in both the second direction D2 and the third direction D3. Next, the valve unit 90 is moved toward the first plate 111.

When the valve unit 90 is moved toward the first plate 111, the second side wall 95 of the valve unit 90 is housed between the two guide walls 135 in the third direction D3. Therefore, the valve unit 90 is positioned with respect to the valve holding portion 130 in the third direction D3. When the valve unit 90 is moved toward the valve holding portion 130, the second side wall 95 of the valve unit 90 is preferably in a state of being in contact with the first inner surface 131a of the first restriction wall 131. Then, a state where the valve unit 90 is positioned with respect to the valve holding portion 130 is easily maintained in the second direction D2.

When the valve unit 90 further approaches the first plate 111, the first side wall 93 of the valve unit 90 is in contact with the two engagement walls 137. As shown in FIG. 8, in the third direction D3, a width W3 of the first side wall 93 of the valve unit 90 is larger than an interval between the locking portions 137b of the two engagement walls 137. Therefore, as the valve unit 90 approaches the first plate 111, the first side wall 93 of the valve unit 90 pushes out the two engagement walls 137. At this time, the two engagement walls 137 are elastically deformed. When the first side wall 93 of the valve unit 90 have passed between the locking portions 137b of the two engagement walls 137, the two engagement walls 137 return to a state before the deformation based on a restoring force corresponding to an elastic deformation amount. As a result, as shown in FIG. 8, the locking portions 137b of the two engagement walls 137 are locked to the first side wall 93 of the valve unit 90.

Figure 8:
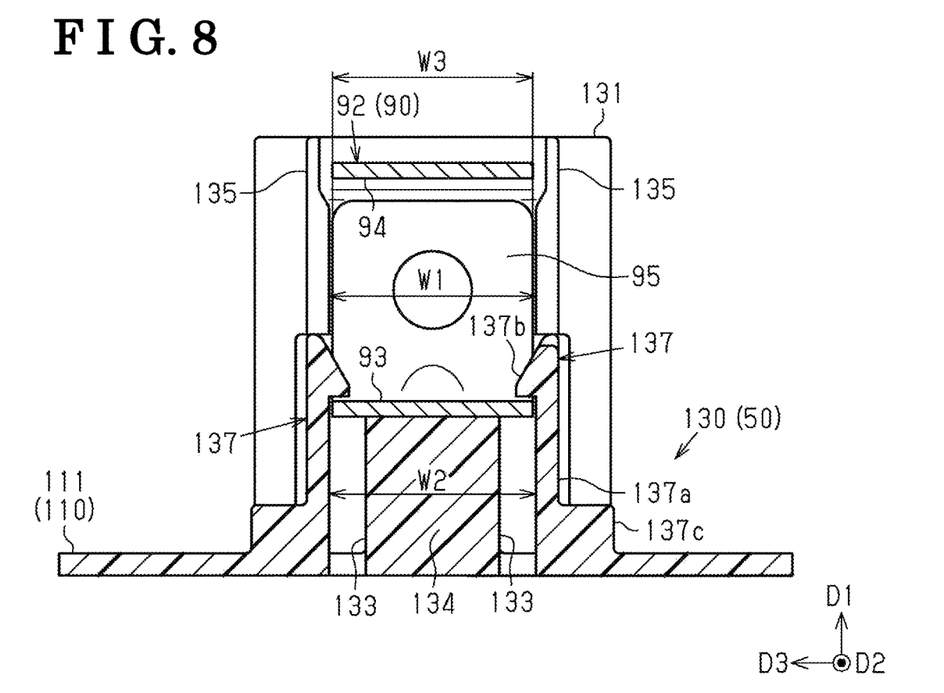
FIG. 8 is a cross-sectional view taken along a line 8-8 in FIG. 7.

Here, in the cross section shown in FIG. 8, widths of the first side wall 93 and the second side wall 95 of the valve unit 90 in the third direction D3 are both "W3". The width W3 of the first side wall 93 and the second side wall 95 in the third direction D3 is smaller than the interval W1 between the two guide walls 135 and the interval W2 between the two extension portions 137a. That is, in the state shown in FIG. 8, the first side wall 93 and the second side wall 95 of the valve unit 90 do not apply a large load to the two guide walls 135 and the two engagement walls 137.

Figure 9:
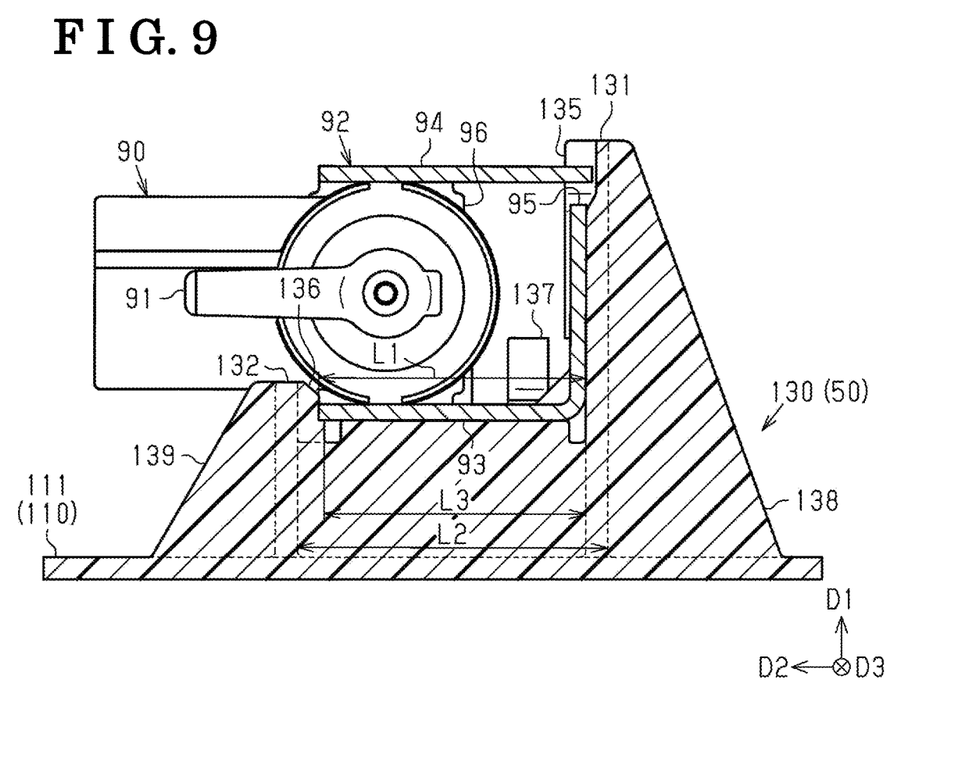
FIG. 9 is a cross-sectional view taken along a line 9-9 in FIG. 7.

As shown in FIG. 9, in the second direction D2, a length L1 of the first side wall 93 of the housing 92 of the valve unit 90 is smaller than an interval L2 between the first restriction wall 131 and the second restriction wall 132, and is larger than an interval L3 between the first restriction wall 131 and the variable rib 136. Further, the housing 92 of the valve unit 90 is made of a metal material, and the variable rib 136 is made of a resin material softer than the housing 92. Therefore, as shown in FIG. 9, when the valve unit 90 approaches the first plate 111, the housing 92 crushes the variable rib 136. At this time, the variable rib 136 is plastically deformed.

When the first side wall 93 of the housing 92 is in contact with the coupling walls 133 of the valve unit 90, mounting of the valve unit 90 on the valve holding portion 130 is completed. That is, the first side wall 93 of the housing 92 of the valve unit 90 is sandwiched by the coupling walls 133 and the two engagement walls 137 in the first direction D1. Further, the first side wall 93 of the housing 92 of the valve unit 90 is sandwiched by the first restriction wall 131 and the second restriction wall 132, specifically, by the first restriction wall 131 and the variable ribs 136 in the second direction D2. Further, the first side wall 93 and the second side wall 95 of the housing 92 of the valve unit 90 are sandwiched by the two guide walls 135 and the two engagement walls 137 in the third direction D3. In this way, relative movement of the valve unit 90 with respect to the valve holding portion 130 of the support panel 50 is restricted.

Next, operations of the air supply apparatus 40 will be briefly described.

A gap may be generated between the waist of the user and the seat back 30 depending on a posture when the user is seated on the vehicle seat 10. In this case, it is highly possible that the user does not take an ideal sitting posture. Therefore, the air supply apparatus 40 is driven such that the user takes the ideal sitting posture. Specifically, the air supply apparatus 40 supplies air to the airbag 70 by driving the pump 60 in a state where the switching valve 91 is energized. In this way, the air supply apparatus 40 inflates the airbag 70. The inflated airbag 70 presses the waist of the user via a cover of the seat back 30. In other words, the inflated airbag 70 supports the waist of the user. In this way, the user can take the ideal sitting posture.

Effects of Present Embodiment (1) In the air supply apparatus 40, the support panel 50 can sandwich the valve unit 90 from the first direction D1, the second direction D2, and the third direction D3. Therefore, the valve unit 90 is mounted on the support panel 50 without using fastening members such as screws and bolts. Therefore, the air supply apparatus 40 can improve ease of mounting the valve unit 90 on the support panel 50.

(2) The first restriction wall 131 and the second restriction wall 132 are coupled by the two coupling walls 133 in the second direction D2. Further, the two coupling walls 133 are coupled by the two intermediate walls 134 in the third direction D3. Therefore, the air supply apparatus 40 can prevent deformation of the first restriction wall 131 and the second restriction wall 132 in the case of mounting the valve unit 90.

(3) For example, in a case of a configuration in which the two guide walls 135 extend from the first plate 111 in the first direction D1, there are many configurations in each of which the two guide walls 135 extend from a narrow region of the first plate 111 in the first direction D1, whereby a shape of the support panel 50 tends to be complicated. In this regard, since the air supply apparatus 40 has the configuration in which the two guide walls 135 extend from the first restriction wall 131, complication of the shape of the support panel 50 can be prevented.

(4) In the air supply apparatus 40, in the case of mounting the valve unit 90 on the support panel 50, the variable ribs 136 are crushed between the valve unit 90 and the second restriction wall 132. Therefore, after the valve unit 90 is mounted on the support panel 50, a gap is less likely to be generated between the support panel 50 and the valve unit 90 in the second direction D2. Therefore, the valve unit 90 mounted on the support panel 50 is less likely to be relatively moved with respect to the support panel 50.

(5) The engagement wall 137 includes the extension portion 137a that extends from the first plate 111 in the first direction D1, and the locking portion 137b provided at the distal end of the extension portion 137a and locked to the valve unit 90. Therefore, the engagement wall 137 functions as a so-called snap fit. Therefore, with the air supply apparatus 40, the engagement walls 137 that perform locking such that the valve unit 90 is not separated from the coupling walls 133 can be implemented with a simple configuration.

(6) Positioning of the valve unit 90 with respect to the support panel 50 in the third direction D3 can be performed by the two guide walls 135. In this regard, in the air supply apparatus 40, a gap is generated between the two extension portions 137a and the valve unit 90 in the third direction D3. Therefore, with the air supply apparatus 40, an excessive load can be prevented from being applied to the two extension portions 137a.

Specifically, in the present embodiment, the interval W2 between the two extension portions 137a in the third direction D3 is larger than the interval W1 between the two guide walls 135 in the third direction D3. Further, the widths of the second side wall 95 of the valve unit 90 housed between the two guide walls 135 and the first side wall 93 of the valve unit 90 housed between the two extension portions 137a in the third direction D3 are both the widths W3, which are smaller than the interval W1 and the interval W2. As a result, a gap is generated between the two extension portions 137a and the first side wall 93 of the valve unit 90 in the third direction D3.

(7) A comparative example in which a height of the first restriction wall 131 is smaller than a height of the valve unit 90 in the first direction D1 is considered. In the case of the comparative example, depending on a size of a gap formed between the support panel 50 and the valve unit 90, the valve unit 90 mounted on the support panel 50 may be inclined about an axis that extends in the third direction D3 with a distal end portion of the first restriction wall 131 as a fulcrum. In this regard, as shown in FIG. 9, since the height of the first restriction wall 131 is larger than the height of the valve unit 90 in the first direction D1 in the air supply apparatus 40, it is possible to prevent occurrence of the situation described above.

Modification

The present embodiment can be implemented with the following modifications. The present embodiment and the following modifications can be implemented in combination with each other within a technically consistent range.

In the embodiment described above, the valve unit 90 corresponds to a "functional component", and the "functional component" to be mounted on the support panel 50 is not limited to the valve unit 90. For example, the functional component may be another valve, the pump 60, or a binding portion that binds a plurality of tubes.

The air supply apparatus 40 may include an airbag for massaging a body of the user. In this case, the air supply apparatus 40 preferably includes a second valve unit for switching a supply destination of air sent out by the pump 60 to the support airbag 70 or to the massage airbag. In this case, the second valve holding unit is preferably mounted on a second valve holding portion of the support panel 50. A plurality of massage airbags are preferably provided so as to be able to massage a plurality of body portions of the user.

The air supply apparatus 40 may include another airbag as the support airbag 70. For example, the air supply apparatus 40 may include an airbag that supports shoulders, an airbag that supports a pelvis, an airbag that supports thighs, and the like.

The air supply apparatus 40 may include a massage airbag instead of the support airbag 70.

The positions of the walls that constitute the valve holding portion 130 can be appropriately changed. For example, the two engagement walls 137 may extend from the first plate 111 in the first direction D1, or may extend from distal end surfaces of the coupling walls 133 in the first direction D1.

The number and the shapes of the walls that constitute the valve holding portion 130 can be appropriately changed. For example, in the valve holding portion 130, the four first reinforcement ribs 138 and the two second reinforcement ribs 139 can be omitted, and the variable ribs 136 can be omitted. Further, in the valve holding portion 130, the shapes of the first restriction wall 131 and the second restriction wall 132 may be the same.

The vehicle seat 10 may be a general massage seat or an office chair.

[Aspect 1] An air supply apparatus for supplying air to an airbag for pressing a user seated on a seat includes: a functional component that is configured to supply air to the airbag; and a support panel on which the functional component is mounted and that is made of a resin material, in which the support panel includes a base having a plate shape, when a direction along a plate thickness direction of the base is a first direction, a direction orthogonal to the first direction is a second direction, and a direction orthogonal to both the first direction and the second direction is a third direction, a first restriction wall and a second restriction wall that extend from the base in the first direction in a state of being spaced at an interval in the second direction and that sandwich the functional component in the second direction, a coupling wall that extends from the base in the first direction and that couples the first restriction wall to the second restriction wall in the second direction, two guide walls that are spaced at an interval in the third direction and that sandwich the functional component in the third direction, and pressing portions that sandwich the functional component together with the coupling wall in the first direction.

In the air supply apparatus, the base can sandwich the functional component from the first direction, the second direction, and the third direction. Therefore, the functional component is mounted on the support panel without using fastening members such as screws and bolts. Therefore, the air supply apparatus can improve ease of mounting the functional component on the support panel.

[Aspect 2] In the air supply apparatus according to Aspect 1, the two guide walls may extend from the first restriction wall toward the second restriction wall.

For example, in a case of a configuration in which the two guide walls extend from the base in the first direction, there are many configurations in each of which the two guide walls extend from a narrow region of the base in the first direction, whereby a shape of the support panel tends to be complicated. In this regard, since the air supply apparatus includes the configuration in which the two guide walls extend from the first restriction wall, complication of the shape of the support panel can be prevented.

[Aspect 3] In the air supply apparatus according to Aspect 2, a variable rib that extends from the second restriction wall toward the first restriction wall may be further included, an interval between the first restriction wall and the variable rib may be smaller than a length of the functional component in the second direction, and the variable rib may be thinner than the second restriction wall in the third direction.

In the air supply apparatus, when the functional component is to be mounted on the support panel, the variable rib is deformed between the functional component and the second restriction wall. Therefore, after the functional component is mounted on the support panel, a gap is less likely to be generated between the support panel and the functional component in the second direction. Therefore, the functional component mounted on the support panel is less likely to be relatively moved with respect to the support panel.

[Aspect 4] In the air supply apparatus according to any one of Aspects 1 to 3, the pressing portions may include two extension portions that extend from the base in the first direction, and two locking portions that are provided at distal ends of the two extension portions and locked to the functional component in a state where the pressing portions are spaced at an interval in the third direction.

In the air supply apparatus, the pressing portion functions as a so-called snap fit. Therefore, with the air supply apparatus, the pressing portion can be implemented with a simple configuration.

[Aspect 5] In the air supply apparatus according to Aspect 4, a gap may be generated between the two extension portions of the pressing portions and the functional component in the third direction.

In the third direction, positioning of the functional component with respect to the support panel can be performed with the two guide walls. In this regard, in the air supply apparatus described above, the gap is generated between the two extension portions and the functional component in the third direction. Therefore, with the air supply apparatus, a load can be prevented from being applied to the two extension portions after the functional component is mounted on the support panel. For example, with the air supply apparatus, the functional component can be prevented from being detached from the support panel due to deformation of the two extension portions.

[Aspect 6] In the air supply apparatus according to any one of Aspects 1 to 5, a height of the first restriction wall may be larger than a height of the functional component in the first direction.

In a case of a comparative example in which a height of a first restriction wall is smaller than a height of the functional component in the first direction, depending on a size of a gap formed between the support panel and the functional component, the functional component mounted on the support panel may be inclined about an axis that extends in the third direction. In this regard, in the air supply apparatus having the configuration described above, since the height of the first restriction wall is larger than the height of the functional component in the first direction, it is possible to prevent occurrence of the situation described above.

[Aspect 7] In the air supply apparatus according to any one of Aspects 1 to 6, when a surface in the first restriction wall facing the second restriction wall is a first inner surface, a surface in the first restriction wall on a side opposite to the first inner surface is a first outer surface, a surface in the second restriction wall facing the first restriction wall is a second inner surface, and a surface in the second restriction wall on a side opposite to the second inner surface is a second outer surface, a first reinforcement rib that extends from the base in the first direction and that is connected to the first outer surface of the first restriction wall, and a second reinforcement rib that extends from the base in the first direction and that is connected to the second outer surface of the second restriction wall may be further included.

In the air supply apparatus, strength of the first restriction wall and strength of the second restriction wall can be increased by the first reinforcement rib and the second reinforcement rib.

[Aspect 8] In the air supply apparatus according to any one of Aspects 1 to 7, the functional component may be a valve unit including a switching valve configured to switch between a state where a flow of air to the airbag from a pump configured to send out air is allowed and a state where the flow of air to the airbag from the pump is restricted.

The air supply apparatus can improve ease of mounting the switching valve on the support panel.

The air supply apparatus can improve ease of mounting the functional component on the support panel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air supply apparatus for supplying air to an airbag for pressing a user seated on a seat, the air supply apparatus comprising:
    a functional component that is configured to supply air to the airbag; and
    a support panel on which the functional component is mounted and that is made of a resin material, wherein
    the support panel includes
        a base having a plate,
        when a direction along a plate thickness direction of the base is a first direction, a direction orthogonal to the first direction is a second direction, and a direction orthogonal to both the first direction and the second direction is a third direction,
        a first restriction wall and a second restriction wall that extend from the base in the first direction spaced at an interval in the second direction and that sandwich the functional component in the second direction,
        a coupling wall that extends from the base in the first direction and that couples the first restriction wall to the second restriction wall in the second direction,
        two guide walls that extend from the first restriction wall toward the second restriction wall, that are spaced at an interval in the third direction, and that sandwich the functional component in the third direction, and
        pressing portions that sandwich the functional component together with the coupling wall in the first direction.

2. The air supply apparatus according to claim 1, further comprising:
    a variable rib that extends from the second restriction wall toward the first restriction wall, wherein
    an interval between the first restriction wall and the variable rib is smaller than a length of the functional component in the second direction, and
    the variable rib is thinner than the second restriction wall in the third direction.

3. The air supply apparatus according to claim 1, wherein the pressing portions include two extension portions that extend from the base in the first direction, and two locking portions that are provided at distal ends of the two extension portions and locked to the functional component in a state where the pressing portions are spaced at an interval in the third direction.

4. The air supply apparatus according to claim 3, wherein a gap is generated between the two extension portions of the pressing portions and the functional component in the third direction.

5. The air supply apparatus according to claim 1, wherein a height of the first restriction wall is larger than a height of the functional component in the first direction.

6. The air supply apparatus according to claim 1, further comprising:
    when a surface in the first restriction wall facing the second restriction wall is a first inner surface, a surface in the first restriction wall on a side opposite to the first inner surface is a first outer surface, a surface in the second restriction wall facing the first restriction wall is a second inner surface, and a surface in the second restriction wall on a side opposite to the second inner surface is a second outer surface,
    a first reinforcement rib that extends from the base in the first direction and that is connected to the first outer surface of the first restriction wall; and
    a second reinforcement rib that extends from the base in the first direction and that is connected to the second outer surface of the second restriction wall.

7. The air supply apparatus according to claim 1, wherein the functional component is a valve unit including a switching valve configured to switch between a state where a flow of air to the airbag from a pump configured to send out air is allowed and a state where the flow of air to the airbag from the pump is restricted.

* * * * *